(12) United States Patent
Kang (10) Patent No.: US 10,665,900 B2
(45) Date of Patent: May 26, 2020

(54) DEVICE FOR MANUFACTURING ELECTRODE ASSEMBLY INCLUDING AIR BLOWING UNIT

(71) Applicant: LG CHEM, LTD., Seoul (KR)

(72) Inventor: Jeong Hwan Kang, Cheongju-si (KR)

(73) Assignee: LG Chem, Ltd. (KR)

( * ) Notice: Subject to any disclaimer, the term of this patent is extended or adjusted under 35 U.S.C. 154(b) by 134 days.

(21) Appl. No.: 15/770,689

(22) PCT Filed: Aug. 10, 2017

(86) PCT No.: PCT/KR2017/008698
§ 371 (c)(1),
(2) Date: Apr. 24, 2018

(87) PCT Pub. No.: WO2018/038435
PCT Pub. Date: Mar. 1, 2018

(65) Prior Publication Data
US 2019/0058222 A1    Feb. 21, 2019

(30) Foreign Application Priority Data

Aug. 26, 2016  (KR) .................. 10-2016-0109355
Jul. 11, 2017  (KR) .................. 10-2017-0087579

(51) Int. Cl.
*H01M 10/0583* (2010.01)
*H01M 10/04* (2006.01)
(Continued)

(52) U.S. Cl.
CPC ... *H01M 10/0583* (2013.01); *H01M 10/0404* (2013.01); *H01M 10/0431* (2013.01); *H01M 10/052* (2013.01); *H01M 10/0587* (2013.01)

(58) Field of Classification Search
None
See application file for complete search history.

(56) References Cited

U.S. PATENT DOCUMENTS 4,026,000 A      5/1977  Anderson
2003/0232243 A1  12/2003 Hong
(Continued)

FOREIGN PATENT DOCUMENTS

EP    2 874 225 A1    5/2015
JP    2001-023619 A   1/2001
(Continued)

OTHER PUBLICATIONS

International Search Report (PCT/ISA/210) issued in PCT/KR2017/008698, dated Dec. 11, 2017.

*Primary Examiner* — Daniel S Gatewood
(74) *Attorney, Agent, or Firm* — Lerner, David, Littenberg, Krumholz & Mentlik, LLP (57) ABSTRACT

Provided is a device for manufacturing an electrode assembly including: a lower air blowing unit for spraying air onto an end part of a separator sheet so that the end part of the cut separator sheet can be bent in an upward direction from the ground during a first winding; and an upper air blowing unit for spraying air onto the end part of the separator sheet so that the end part of the separator sheet can be bent in a downward direction toward the ground of a first unit cell while the first unit cell is firstly wound, thereby preventing a hyphen-shaped fold of the separator sheet during a manufacturing process of an electrode assembly and minimizing defects due to low voltage issues caused by contact between electrodes.

15 Claims, 9 Drawing Sheets (51) Int. Cl.
*H01M 10/0587* (2010.01)
*H01M 10/052* (2010.01)

(56) References Cited

U.S. PATENT DOCUMENTS

| | | |
|---|---|---|
| 2004/0161662 A1 | 8/2004 | Kim et al. |
| 2009/0100669 A1 | 4/2009 | Ikeda et al. |
| 2012/0174386 A1 | 7/2012 | Katayama et al. |
| 2015/0162638 A1 | 6/2015 | Bernini et al. |

FOREIGN PATENT DOCUMENTS

| | | |
|---|---|---|
| JP | 2004-259660 A | 9/2004 |
| JP | 2009-104850 A | 5/2009 |
| JP | 4316861 B2 | 8/2009 |
| JP | 2009193750 A | 8/2009 |
| KR | 10-0483994 B1 | 4/2005 |
| KR | 10-1140447 B1 | 4/2012 |
| KR | 20120060700 A | 6/2012 |
| KR | 10-1287415 B1 | 7/2013 |
| KR | 10-2013-0122997 A | 11/2013 |
| KR | 10-1507229 B1 | 3/2015 |
| KR | 10-2015-0141411 A | 12/2015 |
| KR | 10-1598666 B1 | 3/2016 |
| WO | 2015087492 A1 | 6/2015 |

DEVICE FOR MANUFACTURING ELECTRODE ASSEMBLY INCLUDING AIR BLOWING UNIT

TECHNICAL FIELD

The present disclosure relates to a device for manufacturing an electrode assembly including an air blowing unit.

BACKGROUND ART

Recently, secondary batteries are widely used as power sources for mobile devices such as mobile phones, notebook computers, and camcorders. In particular, the use of lithium secondary batteries has rapidly increased due to advantages that include a high operating voltage and a high energy density per unit weight.

The lithium secondary battery may be classified as a lithium ion battery, a lithium ion polymer battery (LiPB), or a lithium polymer battery depending on the configuration of an electrode and an electrolyte. Among the types of lithium secondary battery, lithium ion polymer batteries, that are less likely to leak an electrolyte and are more easily manufactured, are increasingly used.

The LiPB has a structure in which an electrode assembly in which electrodes (a positive electrode and a negative electrode) and a separator are thermally fused is impregnated with an electrolyte, and is mainly used in a form in which the electrode assembly is sealed in a pouch-shaped case of an aluminum laminate sheet. Therefore, the LiPB is often referred to as a pouch type battery.

Figure 1A:
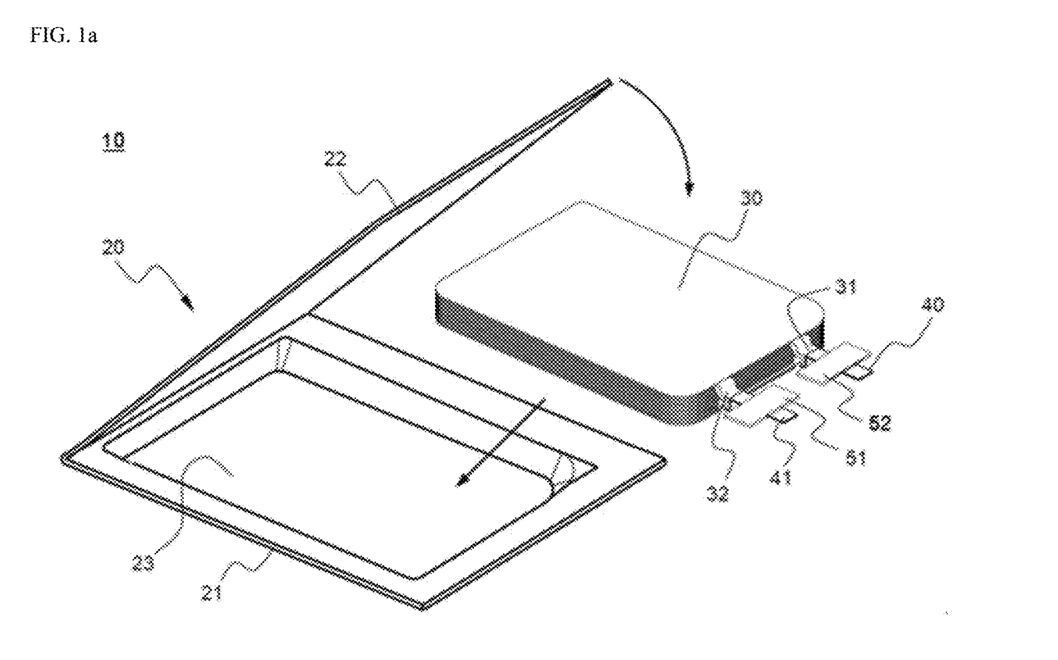
FIG. 1A is an exploded view of a conventional lithium secondary battery.
Figure 1B:
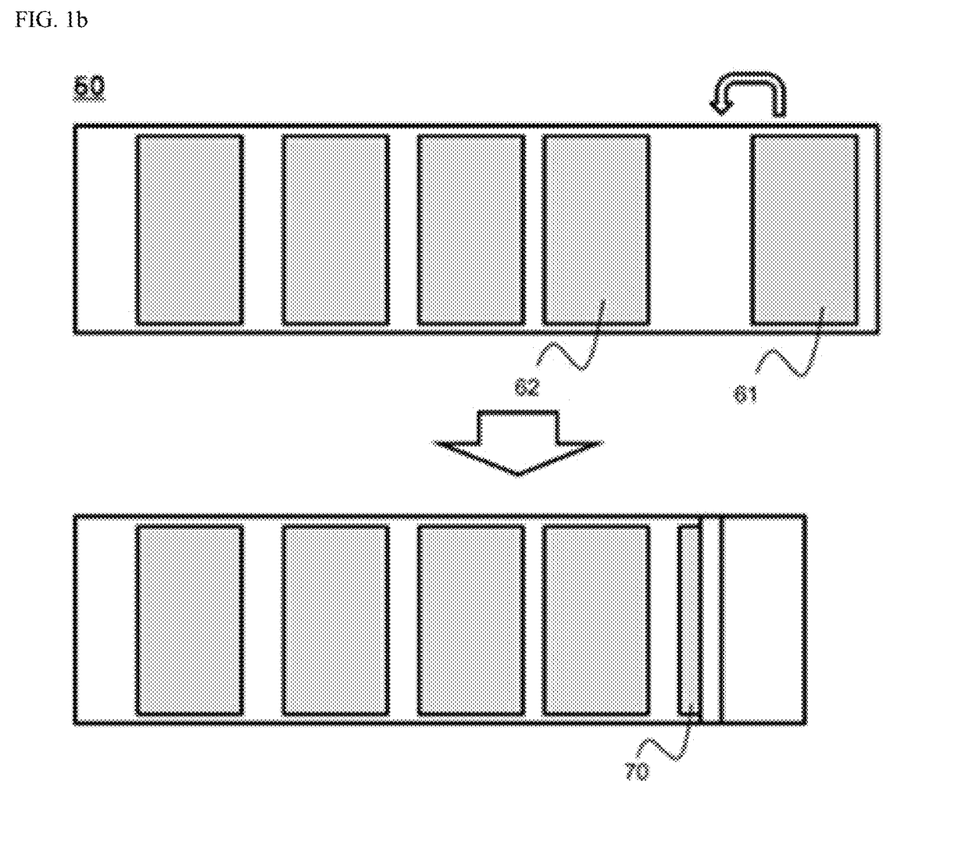
FIG. 1B is a schematic view of a process of manufacturing an electrode assembly of FIG. 1A.

FIG. 1A schematically shows a typical structure of a typical secondary battery including a stacked/folded type electrode assembly, and FIG. 1B schematically shows a process of manufacturing the electrode assembly of FIG. 1A.

Referring to FIG. 1A, a secondary battery 10 has a structure in which an electrode assembly 30, which is composed of a positive electrode, a negative electrode, and a separator disposed therebetween, is built into a pouch type battery case 20, and positive electrode and negative electrode tabs 31 and 32 thereof are welded to two electrode leads 40 and 41 and exposed to the outside of the battery case 20.

The battery case 20 is made of a soft packaging material such as an aluminum laminate sheet, and includes a case body 21 including a concave shaped storage part 23 on which the electrode assembly 30 can be seated, and a lid 22 having one side coupled to the case body 21.

The electrode assembly 30 used in the secondary battery 10 has the stacked/folded structure shown in FIG. 1A. In the electrode assembly 30, a plurality of positive electrode tabs 31 and a plurality of negative electrode tabs 32 are welded to the electrode leads 40 and 41, respectively. Insulating films 51 and 52 are attached to the electrode leads 40 and 41, respectively.

Referring to FIG. 1B, the electrode assembly 30 is manufactured by arranging a plurality of unit cells 61 and 62 on a separator sheet 50 and sequentially winding the separator sheet 50 on the unit cells 61 and 62.

In particular, when an end part 70 (a so-called "zero separator") of the separator sheet 50 covering the first unit cell 61 falls and turns over after a first winding process of the first unit cell 61, a surface of the first unit cell 61 and a surface of the second unit cell 62 are brought into contact with each other, and thus a problem which causes a low voltage issue often occurs.

Accordingly, there is a significant need for technology capable of minimizing separation of a separator sheet from a unit cell during a manufacturing process for an electrode assembly by fundamentally eliminating these problems.

DISCLOSURE

Technical Problem

The present disclosure is provided to solve the above technical problems of the related art.

The present disclosure provides an electrode assembly manufacturing device capable of preventing a hyphen-shaped fold of a separator sheet during a manufacturing process of a stacked/folded type electrode assembly and minimizing defects due to low voltage issues caused by contact between electrodes.

Technical Solution

The present disclosure provides a device for manufacturing an electrode assembly by winding a separator sheet around a plurality of unit cells arranged on the separator sheet.

The electrode assembly manufacturing device includes: a conveyor configured to introduce the separator sheet on which the plurality of unit cells are arranged toward a winder and a cutter; the cutter located apart from the conveyor and configured to cut a part of the separator sheet spaced a predetermined distance apart from a first unit cell in a running direction while the first unit cell located at a head in the running direction of the separator sheet among the plurality of unit cells is located on the winder; a lower air blowing unit located below the cutter and configured to spray air onto an end part of the separator sheet so that the end part of the cut separator sheet is able to be bent in an upward direction from the ground; the winder located between the conveyor and the cutter and configured to sequentially laminate the plurality of unit cells by a method of firstly winding the first unit cell in a counterclockwise direction with a top surface of the first unit cell facing the ground, and repeatedly secondarily winding the first unit cell after waiting for a predetermined time to operate while the end part of the separator sheet is bent; and an upper air blowing unit configured to spray air onto the end part of the separator sheet so that the end part of the separator sheet is able to be bent in a downward direction toward the ground of the first unit cell while the first unit cell is firstly wound.

Therefore, there is a provided an electrode assembly manufacturing device capable of minimizing defects due to low voltage issues caused by contact between electrodes by, in addition to conventionally used conveyors and cutters, a lower air blowing unit configured to spray air onto an end part of a cut separator sheet so that the end part of the separator sheet may be bent in the upward direction from the ground during the first winding; and an upper air blowing unit for spraying air onto the end part of the separator sheet after the first winding of a first unit cell so that the end part of the separator sheet can be bent in the downward direction toward the ground.

In some exemplary embodiments, the electrode assembly may be a stacked/folded type electrode assembly.

In particular, the stacked/folded type electrode assembly may be an electrode assembly manufactured by arranging unit cells having a structure in which a separator is interposed between a positive electrode and a negative electrode on a separator sheet and then folding and winding the separator sheet.

In another exemplary embodiment, the unit cell may be a full cell having a structure of a positive electrode/a separator/a negative electrode.

In some exemplary embodiments, the unit cell may be a bi cell having a structure of a positive electrode/a separator/a negative electrode/a separator/a positive electrode or a negative electrode/a separator/a positive electrode/a separator/a negative electrode.

In another exemplary embodiment, the separator sheet may be cut at a distance of 10 mm to 25 mm from the first unit cell in the running direction so that the end part of the separator sheet is able to sufficiently come into contact with the air sprayed by the upper and lower air blowing units.

As one specific example of the winder, the winder may include: a gripper configured to grip and fix both side end parts of the first unit cell; and a rotating part configured to wind the first unit cell gripped by the gripper.

The winder may have a structure in which the first unit cell is firstly wound in a size range of about 160° to 180° so that the air sprayed from the upper air blowing unit can be sprayed in a straight line toward the end part of the separator sheet. In particular, the winder may have a structure in which the first unit cell is firstly wound in a size range of about 171° to 179°.

In addition, the winder may have a structure in which the winder waits for a period of about 0.2 seconds to 1.0 second after the first winding to operate so that air can be sprayed onto the end part of the separator sheet by the upper air blowing unit for a sufficient time. The structure in which the winder waits to operate can be adjusted on the basis of an amount of air sprayed from the upper air blowing unit, and a distance and angle between the upper air blowing unit and the separator sheet.

As one specific example of the upper air blowing unit, the upper air blowing unit may include: a nozzle configured to spray air onto the separator sheet; a cylinder coupled to the nozzle and configured to adjust an amount of air sprayed; a cylinder support coupled to the cylinder and configured to support the cylinder; and a sensor part coupled to the upper part of the cylinder and configured to sense a position of the nozzle and the separator sheet to adjust a position of the air blowing unit.

In some exemplary embodiments, a distance between the nozzle and the separator sheet may be 20 mm to 45 mm so that the end part of the separator sheet is able to be sufficiently bent toward the ground by the air sprayed from the nozzle.

In addition, an angle formed by an imaginary straight line extending from the end part of the nozzle and an imaginary straight line extending from the end part of the separator sheet may be 20° to 45° so that the end part of the separator sheet is able to be sufficiently bent toward the ground by the air sprayed from the nozzle.

Furthermore, the upper air blowing unit may blow the air downward onto the separator sheet for 0.10 to 0.35 seconds with a spray pressure of 0.1 to 0.5 Mpa so that the end part of the separator sheet is able to be sufficiently bent toward the ground by the air sprayed from the nozzle.

Also, the lower air blowing unit may have a conventional compressed air blower structure in which the air is sprayed onto the end part of the separator sheet so that the end part of the cut separator sheet is able to be bent in the upward direction from the ground.

In another exemplary embodiment, the first unit cell may be arranged on the separator sheet to be separated from the second unit cell by a width of one unit cell.

The present disclosure also provides an electrode assembly manufactured by the device for manufacturing an electrode assembly.

The present disclosure also provides a battery cell having a structure in which the electrode assembly is built into a battery case together with an electrolyte.

The battery cell is not particularly limited, but may be a lithium secondary battery such as a lithium ion battery and a lithium ion polymer battery (LiPB) having advantages that include greater energy density, discharge voltage, and output stability as specific examples.

Advantageous Effects

As described above, an electrode assembly manufacturing device according to the present disclosure can be capable of preventing a hyphen-shaped fold of a separator sheet during a manufacturing process for an electrode assembly and minimizing defects due to low voltage issues caused by contact between electrodes by including a lower air blowing unit that sprays air onto an end part of a cut separator sheet so that the end part of the separator sheet can be bent in an upward direction from the ground; and an upper air blowing unit that blows air onto an end part of the separator sheet so that the end part of the separator sheet can be sufficiently bent toward the ground by the air sprayed from the nozzle.

DETAILED DESCRIPTION OF THE PREFERRED EMBODIMENTS

Hereinafter, embodiments of the present disclosure will be described with reference to the accompanying drawings. However, the description provided herein is for better understanding of the present disclosure, and the scope of the present disclosure is not limited thereto.

Figure 2:
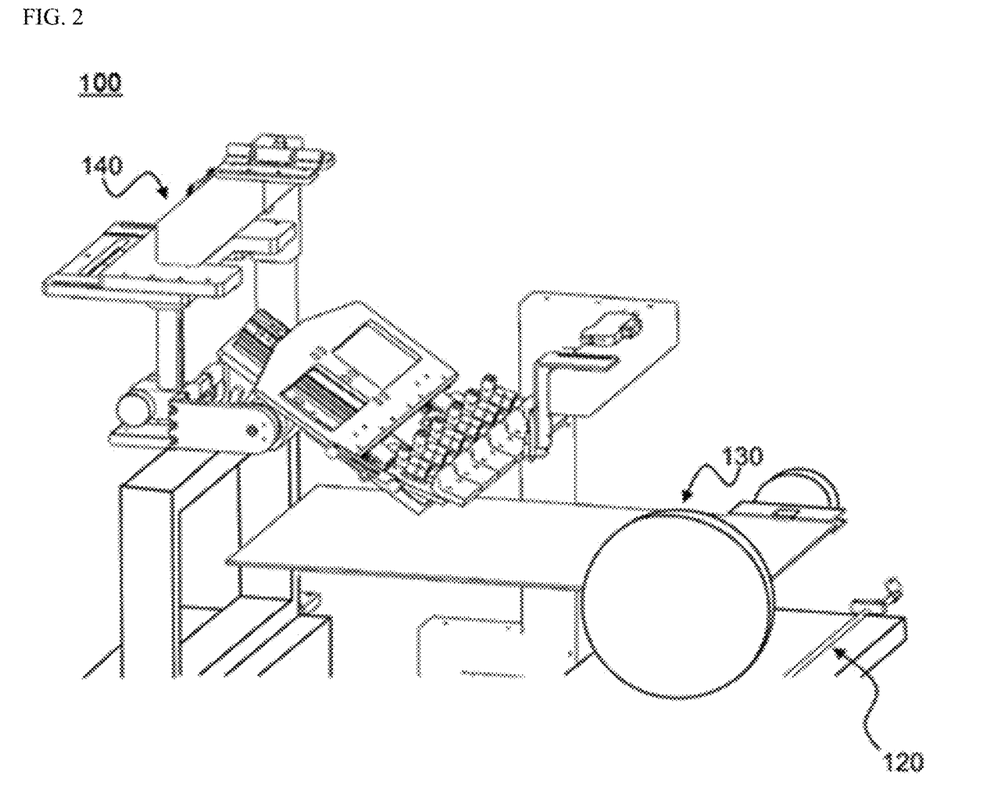
FIG. 2 is a perspective view of an electrode assembly manufacturing device according to one exemplary embodiment of the present disclosure.
Figure 3:
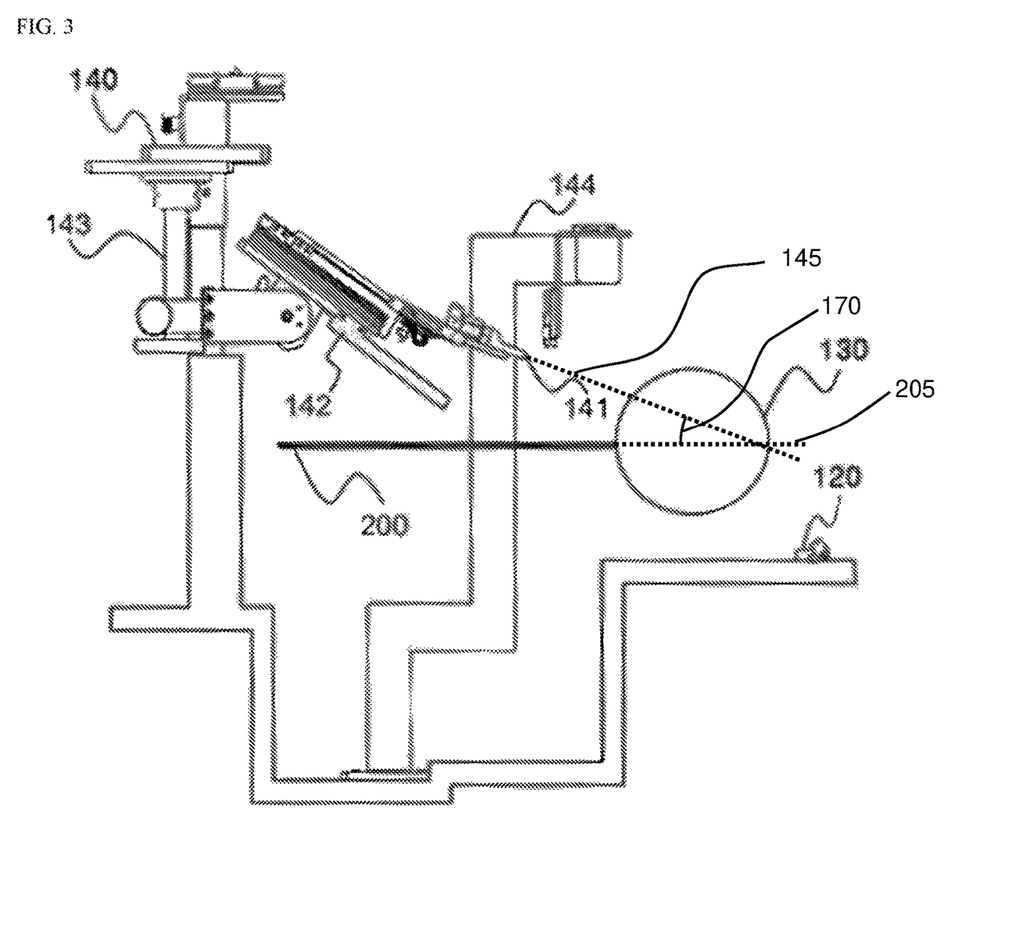
FIG. 3 is a side view of the electrode assembly manufacturing device of FIG. 2.
Figure 4:
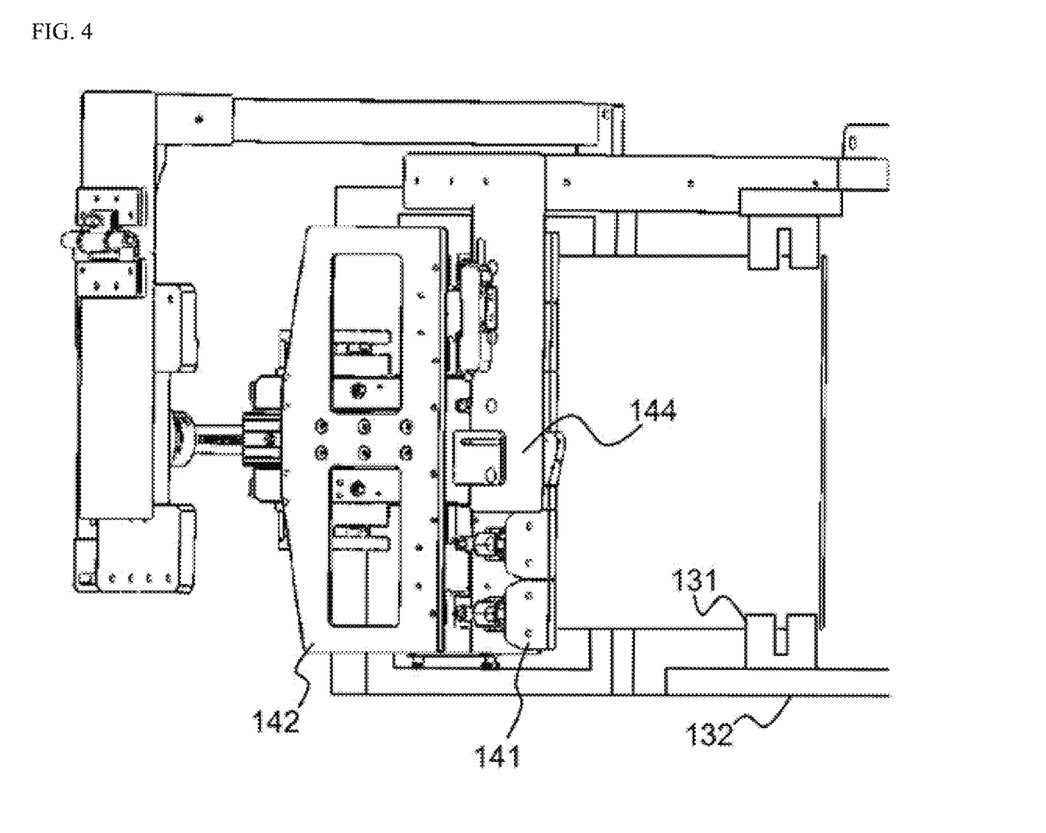
FIG. 4 is a top view of the electrode assembly manufacturing device of FIG. 2.
Figure 5:
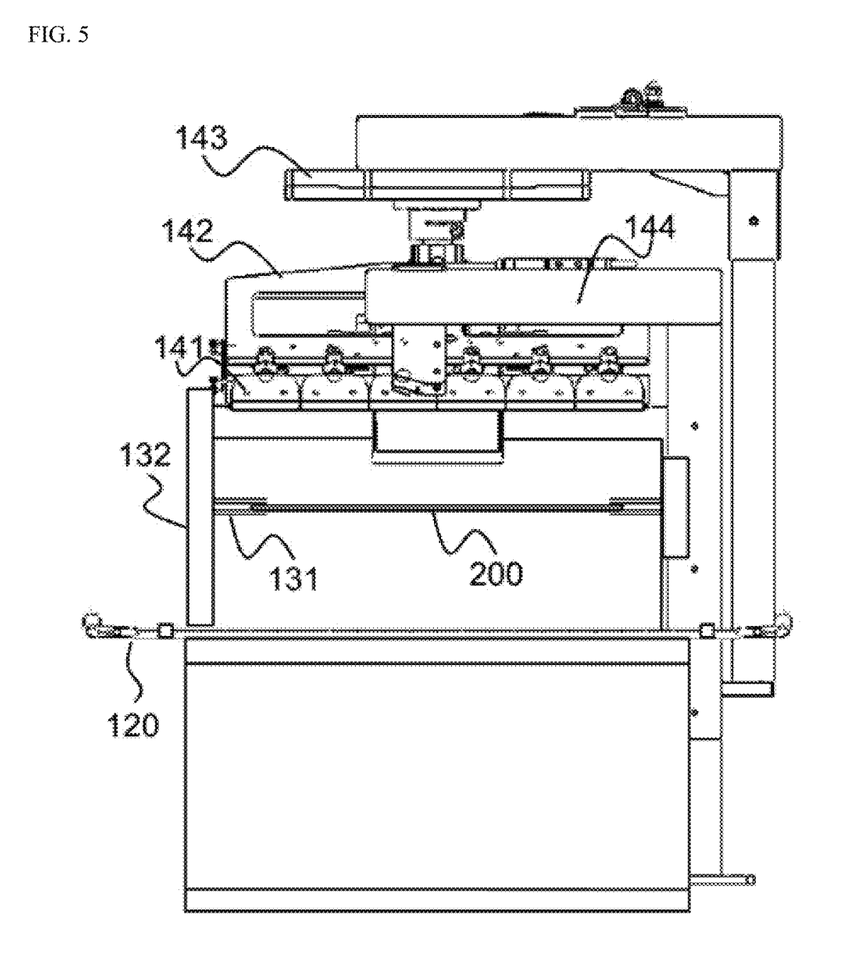
FIG. 5 is a front view of the electrode assembly manufacturing device of FIG. 2.
Figure 6:
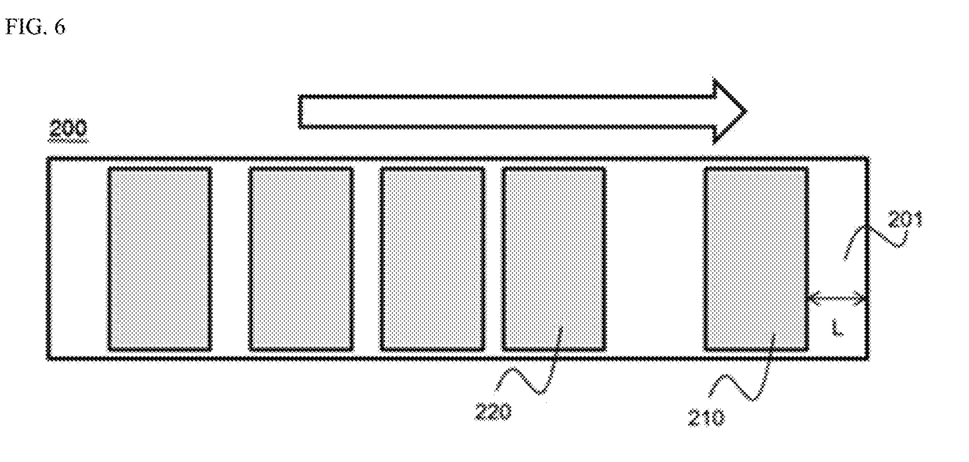
FIG. 6 is a plan view of a separator sheet in which a plurality of unit cells to be put into the electrode assembly manufacturing device of FIG. 2 are arranged.

FIG. 2 is an exemplary perspective view of an electrode assembly manufacturing device according to one exemplary embodiment of the present disclosure; FIG. 3 is an exemplary side view of the electrode assembly manufacturing device of FIG. 2; FIG. 4 is an exemplary top view of the electrode assembly manufacturing device of FIG. 2; FIG. 5 is an exemplary front view of the electrode assembly manufacturing device of FIG. 2; and FIG. 6 is an exemplary plan view of a separator sheet in which a plurality of unit cells to be put into the electrode assembly manufacturing device of FIG. 2 are arranged.

Referring to FIG. 2 to FIG. 5, an electrode assembly manufacturing device 100 includes a conveyor (not shown), a cutter (not shown), a lower air blowing unit 120, a winder 130 and an upper air blowing unit 140.

The electrode assembly may be a stacked/folded type electrode assembly. Particularly, the stacked/folded type electrode assembly is formed by arranging first and second unit cells 210 and 220 having a structure in which a separator is interposed between a positive electrode and a negative electrode on a separator sheet 200 and folding or winding the separator sheet, as shown in FIG. 6.

The unit cell may be a full cell having a structure of a positive electrode/a separator/a negative electrode. According to another exemplary embodiment of the present disclosure, the unit cell may be a bi cell having a structure of a positive electrode/a separator/a negative electrode/a separator/a positive electrode or a negative electrode/a separator/a positive electrode/a separator/a negative electrode.

The conveyor and the cutter have structures and functions commonly used in this field. The conveyor moves the separator sheet 200 in which a plurality of unit cells are arranged toward the winder 130, the cutter cuts an end part 201 of the separator sheet by a length (L), which is 10 to 25 mm apart from the first unit cell 210, which is located at a head in a running direction of the separator sheet 200, in the running direction, while the first unit cell 210 is located on the winder 130. That is, the separator sheet 200 may be cut by the length (L), which is 10 to 25 mm apart from the first unit cell 210 in an outward running direction, so that the end part 201 of the separator sheet 200 can come into sufficient contact with air sprayed by the air blowing units 120 and 140.

The lower air blowing unit 120 sprays air onto the end part 201 of the separator sheet 200 so that the end part 201 of the cut separator sheet 200 can be bent in an upward direction from the ground. The lower air blowing unit 120 has a structure of a conventional compressed air blower. Although not specifically shown in the drawings, for example, nozzles (holes) having a diameter of 0.5 to 1.0 mm are arranged at intervals of 30 to 50 mm with respect to aluminum pipes having a diameter of 3 to 5 mm and a length of 250 to 350 mm, and scales are attached to both sides thereof to facilitate positional movement. It is preferable, but not limiting, for air to be sprayed at a pneumatic fitting condition of 6 mm and air pressure of 0.2 to 0.5 MPa so that a winding angle of the separator sheet 200 is 90°.

The winder 130 includes a gripper 131 that grips and fixes both side ends of the first unit cell 210 and a rotating part 132 that winds the first unit cell 210 gripped by the gripper 131. The winder 130 firstly winds the first unit cell 210 at an angle of about 160° to 180°, and more preferably an angle of about 171° to 179°, in a counterclockwise direction so that a top surface of the first unit cell faces the ground, and repeatedly secondarily winds the first unit cell 210 to laminate a plurality of unit cells thereon after waiting for 0.1 to 0.3 seconds, more preferably for 0.2 seconds, to operate. An angle range of the first winding is a positional angle at which the end part 201 of the separator touches the bottom of the separator sheet after the winding is stopped in consideration of an angle at which a vortex of air to be sprayed can be prevented.

The upper air blowing unit 140 includes a nozzle 141 that sprays air onto the separator sheet 200, a cylinder 142 coupled to the nozzle 141 and configured to adjust an amount of air sprayed, a cylinder support 143 coupled to the cylinder 142 and configured to support the cylinder 142, and a sensor part 144 coupled to an upper part of the cylinder 142 and configured to sense a position of the nozzle 141 and the separator sheet 200 to adjust a position of the air blowing unit 140. In particular, a distance between the nozzle 141 and the separator sheet 200 is preferably about 20 to 45 mm, and an angle 170 formed by an imaginary straight line 145 extending from an end part of the nozzle 141 and an imaginary straight line 205 extending from the end part of the separator sheet 200 is preferably 20° to 45°. After the first winding of the first unit cell 210, the upper air blowing unit 140 sprays air onto the end part 201 of the separator sheet 200 for 0.1 to 0.35 seconds, more preferably for 0.2 to 0.25 seconds, with a spray pressure of 0.1 to 0.5 Mpa, more preferably of 0.3 to 0.4 Mpa, so that the end part 201 of the separator sheet 200 can be sufficiently bent toward the ground of the first unit cell 210.

Referring to FIG. 6, the separator sheet 200 is put into the electrode assembly manufacturing device in a direction of the arrow, and the first unit cell 210 is arranged on the separator sheet 200 to be separated from the second unit cell 220 by a width of one unit cell.

Figure 7:
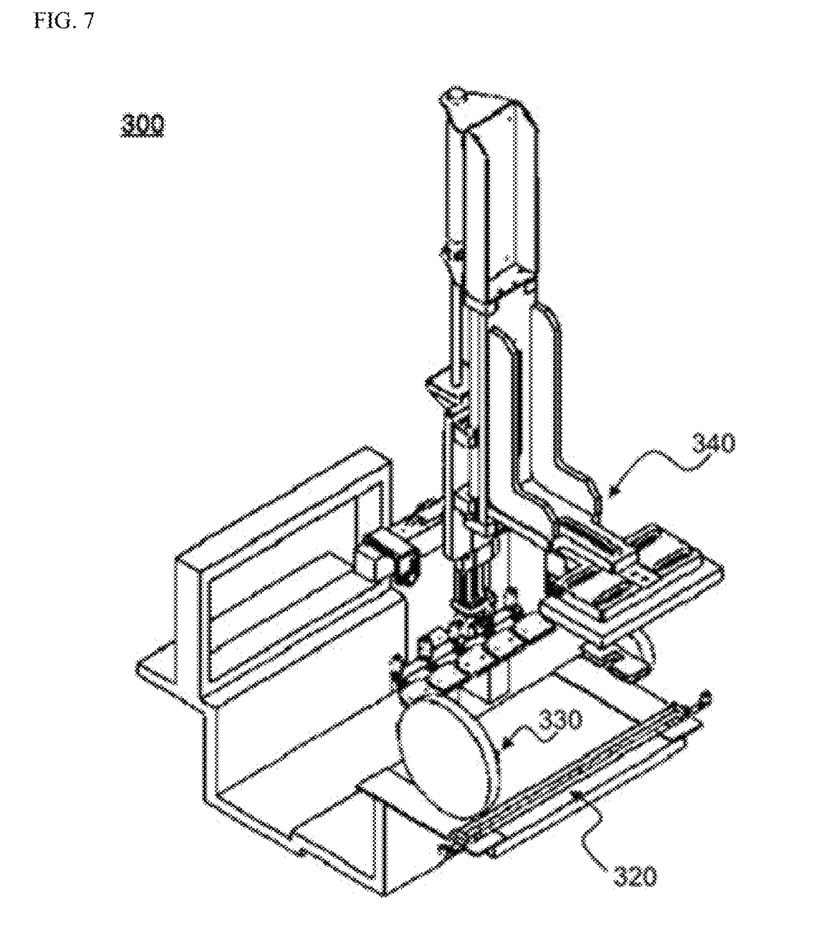
FIG. 7 is a perspective view of an electrode assembly manufacturing device according to another exemplary embodiment of the present disclosure.
Figure 8:
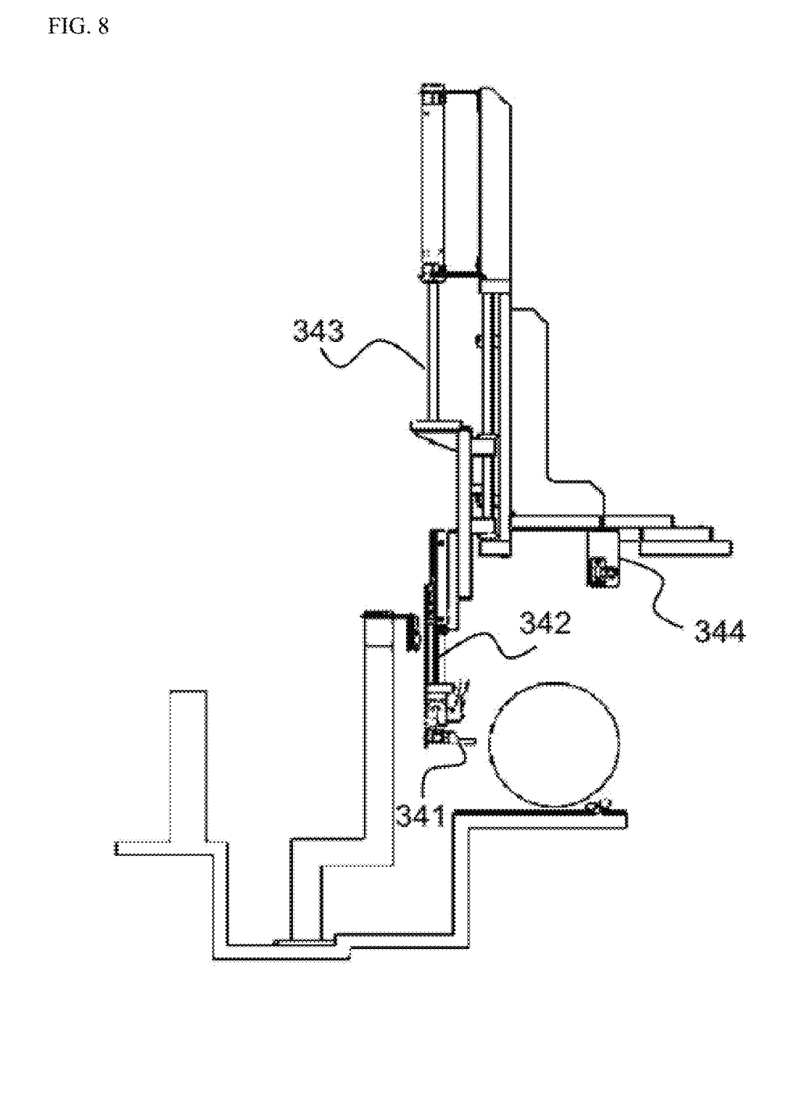
FIG. 8 is a side view of the electrode assembly manufacturing device of FIG. 7.

FIG. 7 is an exemplary perspective view of an electrode assembly manufacturing device according to another exemplary embodiment of the present disclosure, and FIG. 8 is an exemplary side view of the electrode assembly manufacturing device of FIG. 7.

Referring to FIG. 7 and FIG. 8, an electrode assembly manufacturing device 300 includes a lower air blowing unit 320, a winder 330 and an upper air blowing unit 340.

The upper air blowing unit 340 includes a nozzle 341 that sprays air onto a separator sheet (not shown), a cylinder 342 coupled to the nozzle 341 and configured to adjust an amount of air sprayed, a cylinder support 343 coupled to the cylinder 342 and configured to support the cylinder 342, and a sensor part 344 coupled to an upper part of the cylinder 342 and configured to sense a position of the nozzle 341 and the separator sheet 200 to adjust a position of the air blowing unit 340.

The remaining structure except for the above-mentioned structure is identical to the structure of the embodiment described with reference to FIG. 2 to FIG. 6, and a detailed description thereof will be omitted.

Meanwhile, a lithium secondary battery manufactured according to the present disclosure includes a positive electrode, a negative electrode, a separator, and a non-aqueous electrolyte solution containing a lithium salt.

The positive electrode may be prepared, for example, by applying a mixture of a positive electrode active material, a conductive material, and a binder to a positive electrode current collector, and then drying the applied mixture. A filler may be further added to the mixture as needed.

The positive electrode active material may include, for example, a layered compound of lithium cobalt oxide (Li-CoO$_2$), lithium nickel oxide (LiNiO$_2$), etc. or a substituted compound with one or more transition metals; lithium manganese oxide such as Li$_{1+x}$Mn$_{2-x}$O$_4$ (in which x is 0 to 0.33), LiMnO$_3$, LiMn$_2$O, LiMnO$_2$, etc.; lithium copper oxide (Li$_2$CuO$_2$); vanadium oxide such as LiV$_3$O$_8$, LiFe$_3$O$_4$, V$_2$O$_5$, CuZV$_2$O$_7$, etc.; Ni site-type lithium nickel oxide represented by Chemical Formula of LiNi1-xMxO$_2$ (in which, M=Co, Mn, Al, Cu, Fe, Mg, B or Ga, x=0.01 to 0.3); lithium manganese complex oxide represented by Chemical Formula LiMn$_2$-xMxO$_2$ (in which M=Co, Ni, Fe, Cr, Zn or Ta, and x=0.01 to 0.1) or Li$_2$Mn$_3$MO$_8$ (in which, M=Fe, Co, Ni, Cu or Zn); spinel-structured lithium manganese composite oxide represented by LiNixMn$_2$-xO$_4$; LiMn$_2$O$_4$ in which a portion of Li is substituted with alkaline earth metal ions; a disulfide compound; Fe$_2$ (MoO$_4$)$_3$, and the like. However, the present disclosure may not be limited thereof.

The conductive agent is generally added so that the conductive agent has 1 to 30 wt % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The binder is a component assisting in binding between the active material and conductive agent and in binding with the current collector. The binder is generally added in an amount of 1 to 30 wt % based on the total weight of the compound including the positive electrode active material. As examples of the binder, there may be used polyvinylidene fluoride, polyvinyl alcohol, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, and various copolymers.

The filler is an optional component used to inhibit expansion of the positive electrode. There is no particular limit to the filler so long as the filler does not cause chemical changes in a battery to which the filler is applied, and is made of a fibrous material. As examples of the filler, there may be used olefin polymers, such as polyethylene and polypropylene; and fibrous materials, such as glass fiber and carbon fiber.

The negative electrode is prepared by applying and drying a negative electrode active material to a negative electrode current collector. Optionally, the above-described components may be selectively added to the negative electrode active material as needed.

As the negative electrode active material, for example, there may be used carbon, such as non-graphitizing carbon or a graphite-based carbon; a metal composite oxide, such as Li$_x$Fe$_2$O$_3$ (0≤x≤1), LixWO$_2$ (0≤x≤1), Sn$_x$Me$_{1-x}$Me'$_y$O$_z$ (Me: Mn, Fe, Pb, Ge; Me': Al, B, P, Si, Group 1, 2 and 3 elements of the periodic table, halogen; 0≤x≤1; 1≤y≤3; 1≤z≤8); lithium metal; lithium alloy; silicon-based alloy; tin-based alloy; a metal oxide, such as SnO, SnO$_2$, PbO, PbO$_2$, Pb$_2$O$_3$, Pb$_3$O$_4$, Sb$_2$O$_3$, Sb$_2$O$_4$, Sb$_2$O$_5$, GeO, GeO$_2$, Bi$_2$O$_3$, Bi$_2$O$_4$, or Bi$_2$O$_5$; conductive polymer, such as polyacetylene; or a Li—Co—Ni based material.

The separator and a separator film are interposed between the positive electrode and the negative electrode, and an insulating thin film having high ion permeability and mechanical strength is used. A pore diameter of the separator is generally 0.01 to 10 μm, and a thickness thereof is generally 5 to 130 μm. For example, there may be used olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

Meanwhile, in a concrete example, to improve battery safety, the separator and the safety separator each may be an organic/inorganic composite porous safety-reinforcing separator (SRS).

The SRS separator may be configured such that an active layer, including inorganic particles and a binder polymer, is coated on a polyolefin-based separator substrate. The SRS separator may have a pore structure included in the separator substrate and a uniform pore structure formed by the interstitial volume among inorganic particles as active layer ingredients.

The use of the organic/inorganic composite porous separator has an advantage of suppressing an increase of cell thickness due to swelling during a formation process in comparison to a case in which a conventional separator is used, and when a binder polymer is impregnated with a liquid electrolyte, a gelable polymer can be used as an electrolyte at the same time.

In addition, the organic/inorganic composite porous separator can exhibit excellent adhesive force characteristics by a content of the inorganic particles and the binder polymer, which are components of the active layer in the separator, being controlled so that the battery assembly process can be easily performed.

The inorganic particles are not particularly restricted so long as the inorganic particles are electrochemically stable. That is, the inorganic particles that can be used in the present invention are not particularly restricted so long as the inorganic particles are not oxidized and/or reduced within an operating voltage range (e.g. 0 to 5 V based on Li/Li+) of a battery to which inorganic particles are applied. In particular, in a case in which inorganic particles having ion transfer ability are used, it is possible to improve ion conductivity in an electrochemical element, thereby improving the performance of the battery. Consequently, it is preferable that ion conductivity of the inorganic particles be as high as possible. In addition, in a case in which the inorganic particles have high density, it may be difficult to disperse the inorganic particles at the time of coating, and the weight of the battery may increase. For these reasons, it is preferable that density of the inorganic particles be as low as possible. Additionally, in a case in which the inorganic particles have high permittivity, a degree of dissociation of electrolyte salt, such as lithium salt, in a liquid electrolyte may increase, thereby improving ion conductivity of the electrolytic solution.

A non-aqueous electrolyte solution containing a lithium salt may include a polar organic electrolyte solution and a lithium salt. A non-aqueous liquid electrolyte solution, an organic solid electrolyte, an inorganic solid electrolyte, and the like may be used as the electrolyte solution.

As examples of the non-aqueous liquid electrolytic solution, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

As examples of the organic solid electrolyte, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte, mention may be made of nitrides, halides, and sulphates of lithium (Li), such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt is a material that is readily soluble in the above-mentioned non-aqueous electrolyte, and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolytic solution. According to circumstances, in order to impart incombustibility, the non-aqueous electrolytic solution may further include halogen-containing solvents, such as carbon tetrachloride and ethylene trifluoride. Furthermore, in order to improve high-temperature storage characteristics, the non-aqueous electrolytic solution may further include carbon dioxide gas.

Although the exemplary embodiments of the present disclosure have been disclosed for illustrative purposes, those skilled in the art will appreciate that various modifications, additions and substitutions are possible, without departing from the scope and spirit of the present disclosure as disclosed in the accompanying claims.

The invention claimed is:

1. A device for manufacturing an electrode assembly by winding a separator sheet around a plurality of unit cells arranged on the separator sheet, the device comprising:
   a winder;
   a cut part of the separator sheet spaced a predetermined distance apart from a first unit cell in a running direction while the first unit cell located at a head in the running direction of the separator sheet among the plurality of unit cells is located on the winder;
   a lower air blowing unit configured to spray air onto an end part of the separator sheet so that the end part of the cut separator sheet is able to be bent in an upward direction from the ground;
   a winder configured to sequentially laminate the plurality of unit cells by a method of firstly winding the first unit cell in a counterclockwise direction with a top surface of the first unit cell facing the ground, and repeatedly secondarily winding the first unit cell after waiting for a predetermined time for the upper air blowing unit to operate while the end part of the separator sheet is bent; and
   an upper air blowing unit configured to spray air onto the end part of the separator sheet so that the end part of the separator sheet is able to be bent in a downward direction toward the ground of the first unit cell while the first unit cell is firstly wound.

2. The device according to claim 1, wherein the electrode assembly is a stacked/folded type electrode assembly.

3. The device according to claim 2, wherein the unit cell is a full cell having a structure of a positive electrode/a separator/a negative electrode.

4. The device according to claim 2, wherein the unit cell is a bi cell having a structure of a positive electrode/a separator/a negative electrode/a separator/a positive electrode or a negative electrode/a separator/a positive electrode/a separator/a negative electrode.

5. The device according to claim 1, wherein the separator sheet is cut at a distance of 10 mm to 25 mm from the first unit cell in the running direction.

6. The device according to claim 1, wherein the winder comprises:
   a gripper configured to grip and fix both side end parts of the first unit cell; and
   a rotating part configured to wind the first unit cell gripped by the gripper.

7. The device according to claim 1, wherein the winder firstly winds the first unit cell at an angle of about 160° to 180°.

8. The device according to claim 1, wherein the winder waits for a period of about 0.2 seconds to 1.0 second after the first winding to operate.

9. The device according to claim 1, wherein the upper air blowing unit comprises:
   a nozzle configured to spray air onto the separator sheet;
   a cylinder coupled to the nozzle and configured to adjust an amount of air sprayed;
   a cylinder support coupled to the cylinder and configured to support the cylinder; and
   a sensor part coupled to an upper part of the cylinder, and configured to sense a position of the nozzle and the separator sheet and adjust a position of the air blowing unit.

10. The device according to claim 9, wherein a distance between the nozzle and the separator sheet may be 20 mm to 40 mm.

11. The device according to claim 9, wherein an angle formed by an imaginary straight line extending from an end part of the nozzle and an imaginary straight line extending from the end part or the separator sheet may be 20° to 45°.

12. The device according to claim 1, wherein the lower air blowing unit sprays air onto the separator sheet at an air pressure of 0.2 to 0.5 MPa so that a winding angle of the separator sheet is 90°, and the upper air blowing unit sprays the air downward onto the separator sheet for 0.10 to 0.35 seconds at a spray pressure of 0.1 to 0.5 Mpa.

13. The device according to claim 1, wherein the first unit cell may be arranged on the separator sheet to be separated from a second unit cell by a width of one unit cell.

14. An electrode assembly manufactured by the device for manufacturing an electrode assembly according to claim 1.

15. A battery cell in which the electrode assembly according to claim 14 is built into a battery case together with an electrolyte.

* * * * *